Dec. 4, 1956  A. E. LEINO  2,772,707
LENGTH AND SQUARE GUIDE FOR A POWER HAND SAW
Filed Feb. 8, 1955  2 Sheets—Sheet 2
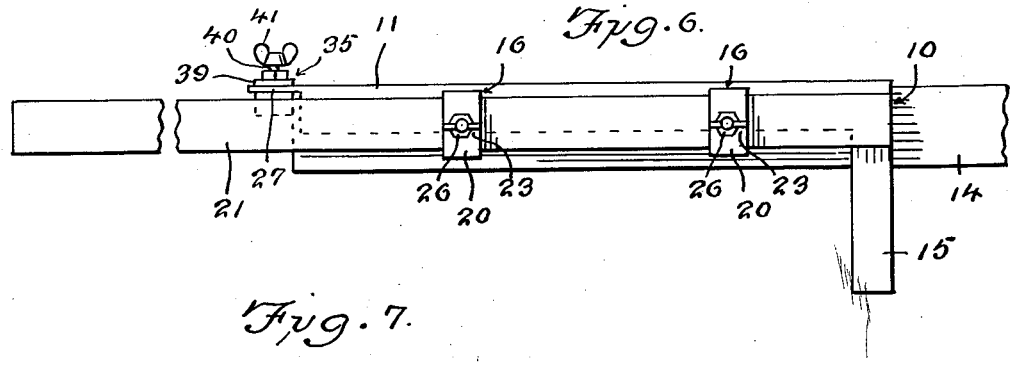
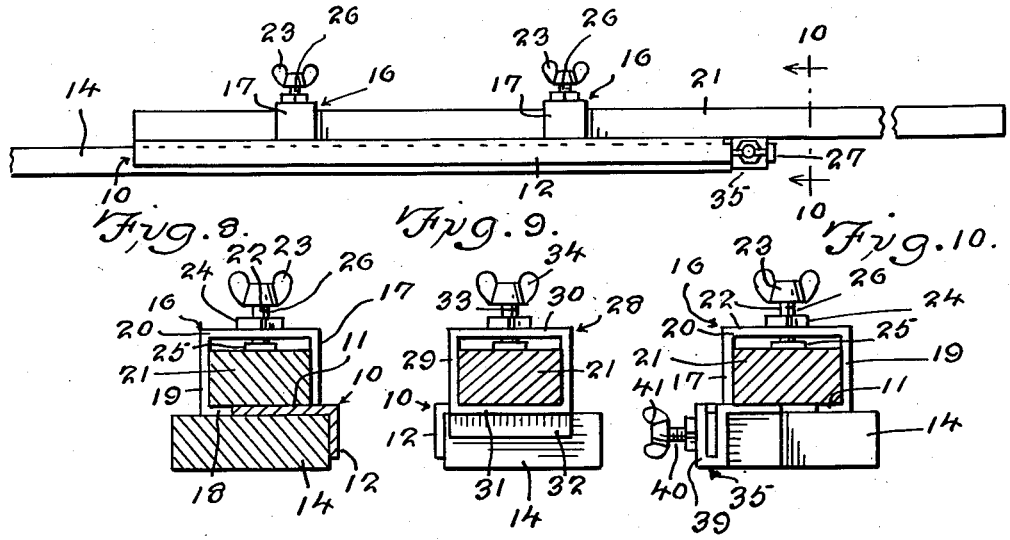
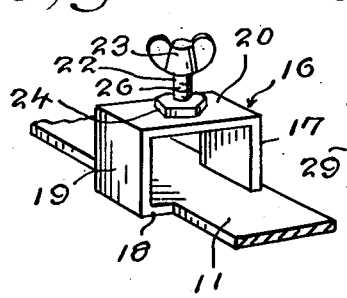 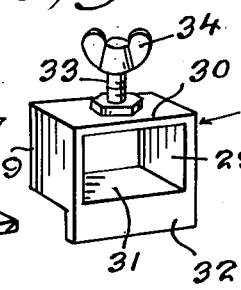 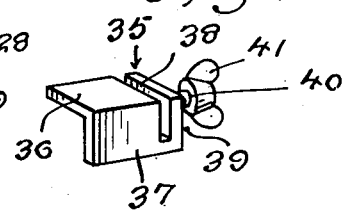
INVENTOR.
Arnie E. Leino
BY Victor J. Evans & Co.
ATTORNEYS United States Patent Office 2,772,707
Patented Dec. 4, 1956

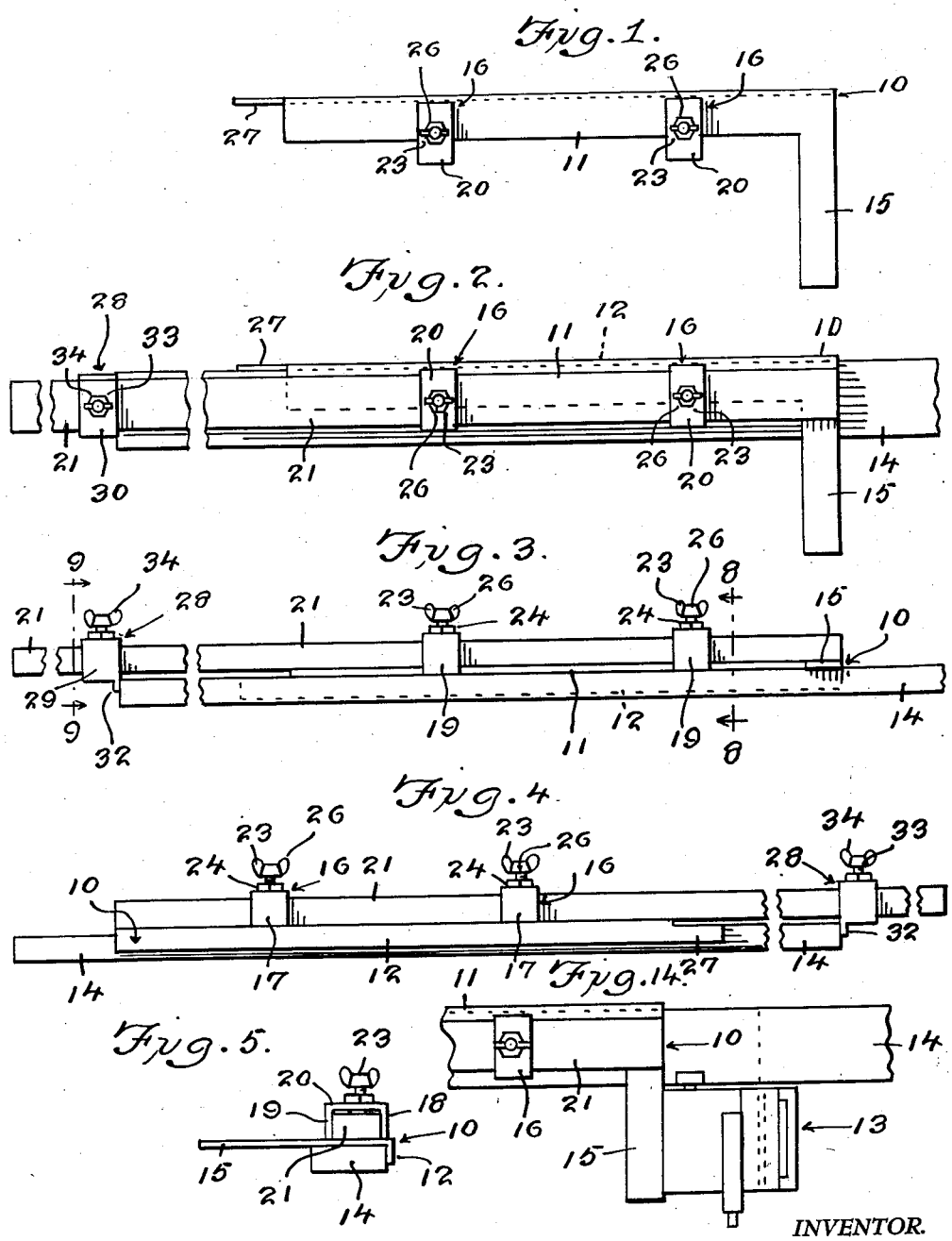

2,772,707

LENGTH AND SQUARE GUIDE FOR A POWER HAND SAW

Arnie E. Leino, Warrenville, Ill.

Application February 8, 1955, Serial No. 486,841

1 Claim. (Cl. 143—47)

This invention relates to a tool guide, and more particularly to a guide for a saw such as a power saw.

The object of the invention is to provide a guide which is adapted to be used with a power saw whereby material such as lumber can be accurately and easily cut to a desired size.

A further object of the invention is to provide a power saw guide which includes a base that has brackets secured thereto whereby a suitable piece of material such as lumber can be extended through the brackets, there being a stop member adjustably mounted on one end of the base, and whereby the lumber to be cut can be engaged by the base so that lumber such as studding can be cut to the proper shape and size.

A further object of the invention is to provide a power saw guide which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the base.

Figure 2 is a top plan view showing the device mounted on the board or lumber to be cut.

Figure 3 is a side elevational view of the assembly shown in Figure 2.

Figure 4 is a side elevational view looking at the opposite side from Figure 3.

Figure 5 is an end elevational view of the unit mounted on the lumber.

Figure 6 is a view similar to Figure 2 but illustrating a modification wherein a different stop member is used as when shorter pieces of lumber are being cut.

Figure 7 is a side elevational view of the assembly shown in Figure 6.

Figure 8 is a sectional view taken on the line 8—8 of Figure 3.

Figure 9 is a sectional view taken on the line 9—9 of Figure 3.

Figure 10 is a sectional view taken on the line 10—10 of Figure 7.

Figure 11 is a fragmentary perspective view, with parts broken away and in section, showing one of the brackets.

Figure 12 is a perspective view of the stop member for use with the arrangement shown in Figures 1–4.

Figure 13 is a perspective view of the modified stop member shown being used in Figures 6 and 7 and 10.

Figure 14 (Sheet 1) is a fragmentary perspective view illustrating the power saw abutting an end of the device for cutting the lumber.

Referring in detail to the drawings, the numeral 10 designates a base which can be made of any suitable material, and the base 10 includes a first leg or flange 11 and a second leg or flange 12, the legs 11 and 12 being arranged at right angles with respect to each other and adapted to engage a piece of lumber or studding 14 which is to be cut by a power saw 13.

Extending outwardly from the first leg 11 and secured thereto or formed integral therewith is a bar 15 which is adapted to be engaged by an end of the power saw 13, Figure 14, and the edge of the bar 15 provides a guide for the power saw in cutting the wood 14. There is further provided a plurality of brackets which are each indicated by the numeral 16, Figure 11. Each of the brackets 16 are secured to the first leg 11 of the base 10, and each bracket 16 includes an arm 17 which extends from the leg 11 and is secured thereto in any suitable manner. A finger 18 extends outwardly from an edge of the leg 11, and extending at right angles from the finger 18 is an arm 19, the arms 17 and 19 being arranged in spaced parallel relation with respect to each other. A web 20 interconnects the arms 17 and 19 together. Extending between the plurality of brackets 16 is a piece of lumber 21 which is snugly received in the brackets, and securing elements such as bolts 26 each have a threaded portion 22 which engages nuts 24 that may be secured to the outer surface of the web 20. A head 23 is secured to the outer end of each of the bolts 26, so that by rotating the head or wing nut 23 the bolt 26 can be rotated to thereby cause a washer 25 on the inner end of the bolt 26 to engage the piece of material 21. Thus, by tightening the bolts 26 the material 21 can be securely clamped within the brackets 16, and the projecting end of the lumber 21 can be used as a handle for holding the apparatus as for example as shown in Figure 6.

Extending from an end of the leg 12 is a lip 27. There is further provided a stop member which is indicated generally by the numeral 28, Figure 12, and the stop member 28 includes walls 29 which are arranged in spaced parallel relation with respect to each other. Wall members 30 and 31 extend between the walls 29, and a flange 32 extends from the wall member 31. The flange 32 is adapted to abut an end of the board 14 as shown in Figure 3, and the hollow stop member 28 receives therein or has projecting therethrough the board 21. A bolt 33 extends through the wall member 30, and a wing nut or head 34 is secured to the outer end of the bolt 33 so that by rotating the nut 34, the inner end of the bolt 33 can be mounted or moved into and out of engagement with the board 21 to thereby lock or maintain the stop member 28 immobile in its various adjusted positions on the board 21.

When shorter pieces of studding or board 14 are to be cut, a stop member 35 can be used in lieu of the stop member 28. The stop member 35 is shown in detail in Figure 13, and includes flat portions 36 and 37 which are arranged at right angles with respect to each other, there being a cutout or slit 38 in the stop member 35 which defines a wall member 39. The cut out 38 slidably receives therein the lip 27, and a bolt 40 extends through the wall member 39 for engaging the lip 27 to maintain the stop member 35 immobile on the lip. A head or wing nut 41 is provided on the end of the bolt 40 for rotating the bolt.

From the foregoing it is apparent that there has been provided a power saw guide and in use the wood 14 to be cut by the saw 13 is positioned so that it is engaged by the legs 11 and 12 as shown in Figures 5 and 8 for example. A piece of board or wood 21 is inserted through the brackets 16 and then the bolts 26 are tightened by the nuts 23. Then, the stop member 28 is mounted on the board 21 and moved therealong until the flange 32 abuts the end of the board 14 so that the bar 15 can be positioned at predetermined distances along the board 14. Then, by moving the power saw 13 along the outer edge of the bar 15, the board 14 can be cut as for example it can be cut along the dotted lines shown in Figure 14. Instead of using the stop member 28, the stop member 35 can be used and when the stop member 35 is being used the cutout 38 receives the lip 27 and again the stop member 35 abuts the end of the board 14 which is to be cut.

With the present invention lumber can be cut to a desired length and the bar 15 also acts as a square guide, the device being especially suitable for cutting studding as during construction of a house. The present invention will save time in cutting studding, window headers and solid bridging.

I claim:

In a power saw guide, a base embodying a horizontal first flange, a second flange arranged at right angles with respect to said first flange, said flanges adapted to engage a first piece of material to be cut, a bar extending outwardly from said first flange and arranged at a 90 degree angle with respect to an end thereof, said bar adapted to be engaged by a saw, a pair of hollow brackets on said base for the projection therethrough of a second piece of material and each of said brackets including a first arm extending upwardly from said first flange, said first flange engaging the top of said first piece of material, said second flange lying in a vertical plane and engaging the edge of the first piece of material, a finger extending outwardly from an edge of said first flange, a second arm arranged in spaced parallel relation with respect to said first arm and extending from said finger, a web extending between said first and second arms and arranged at right angles with respect to said arms, a securing element extending through each of the webs of said brackets, and a stop member adjustably mounted on said second piece of material and including an adjustable securing element.

References Cited in the file of this patent
UNITED STATES PATENTS

| | | |
|---|---|---|
| 1,911,045 | Tinnen | May 23, 1933 |
| 2,661,034 | MacDonald | Dec. 1, 1953 |
| 2,704,092 | Green | Mar. 15, 1955 |